(12) United States Patent
Singh et al.

(10) Patent No.: US 9,049,248 B2
(45) Date of Patent: Jun. 2, 2015

(54) METHOD AND APPARATUS PERTAINING TO ENERGY EFFICIENT TASK EXECUTION OFFLOADING

(75) Inventors: Ajit Singh, Waterloo (CA); Rajesh Palit, Waterloo (CA); Kshirasagar Naik, Waterloo (CA)

(73) Assignee: BlackBerry Limited, Waterloo (CA)

( * ) Notice: Subject to any disclaimer, the term of this patent is extended or adjusted under 35 U.S.C. 154(b) by 291 days.

(21) Appl. No.: 13/299,853

(22) Filed: Nov. 18, 2011

(65) Prior Publication Data

US 2012/0131137 A1 May 24, 2012

Related U.S. Application Data

(60) Provisional application No. 61/415,606, filed on Nov. 19, 2010.

(51) Int. Cl.
*G06F 15/16* (2006.01)
*H04L 29/08* (2006.01)

(52) U.S. Cl.
CPC .................................. *H04L 67/2861* (2013.01)

(58) Field of Classification Search
USPC ........................... 709/217, 220, 226; 718/104
See application file for complete search history.

(56) References Cited

U.S. PATENT DOCUMENTS

| | | | |
|---|---|---|---|
| 7,715,825 B2 | 5/2010 | Lewis et al. | |
| 2003/0158940 A1* | 8/2003 | Leigh | 709/226 |
| 2009/0210519 A1* | 8/2009 | Zill et al. | 709/220 |
| 2009/0287405 A1* | 11/2009 | Liu et al. | 701/119 |
| 2010/0088387 A1* | 4/2010 | Calamera | 709/207 |
| 2010/0203876 A1* | 8/2010 | Krishnaswamy | 455/418 |
| 2010/0261488 A1* | 10/2010 | Little et al. | 455/466 |
| 2010/0272258 A1 | 10/2010 | Sadovsky et al. | |
| 2010/0285781 A1* | 11/2010 | Dai et al. | 455/414.1 |
| 2011/0051642 A1 | 3/2011 | Krishnaswamy | |
| 2012/0135726 A1* | 5/2012 | Luna et al. | 455/422.1 |

OTHER PUBLICATIONS

Rajesh Krishna Balan, "Powerful Change Part 2: Reducing the Power Demands of Mobile Devices," IEEE; Pervasive Computing, vol. 2, No. 2; Apr. 1, 2004; 3 pages.
Goyal et al., "A Lightweight Secure Cyber Foraging Infrastructure for Resource-Constrained Devices," IEEE; Proceedings of the Sixth IEEE Workshop on Mobile Computing Systems and Applications; Dec. 2, 2004; 10 pages.
Buford et al., "Sleeper: A Power-Conserving Service Discovery Protocol," IEEE; 3rd Annual International Conference on Mobile and Ubiquitous Systems—Workshops; Jul. 1, 2006; 10 pages.
Allman et al., "Enabling an Energy-Efficient Future Internet Through Selectively Connected End Systems," In 6th ACM Workshop on Hot Topics in Networks (HotNets); ACM; Nov. 1, 2007; 7 pages.

(Continued)

*Primary Examiner* — Thomas Dailey
(74) *Attorney, Agent, or Firm* — Fitch, Even, Tabin & Flannery LLP

(57) ABSTRACT

A control circuit (such as a smartphone processor) having access to a wireless two-way transceiver (such as a short-range transceiver) determines a need to offload execution of a task to a server and then determines present unavailability of that server. This control circuit then transmits a first message to the server to prompt the server to awaken. The control circuit then transmits a second message to the server to establish a wireless connection that the control circuit employs to offload execution of the task to the server. By one approach, the aforementioned first message can include a unique identifier for the server. If desired, this unique identifier can have been provided earlier by the server via a general broadcast.

16 Claims, 3 Drawing Sheets

(56) References Cited

OTHER PUBLICATIONS

Extended European Search Report from related European Patent Application No. 11189842.5; Mar. 6, 2012; 9 pages.

Li et al., "Energy Impact of Secure Computation on a Handheld Device," IEEE International Workshop on Workload Characterization; Nov. 25, 2002; pp. 109-117.

Yang et al., "On Effective Offloading Services for Resource-Constrained Mobile Devices Running Heavier Mobile Internet Applications," IEEE Communications Magazine; Jan. 2008; pp. 56-63.

PCT Search Report and Written Opinion from related application No. PCT/CA2011/050719, dated Jan. 31, 2012; 11 pages.

Canadian Office Action from related Canadian Patent Application No. 2,818,259 dated Jan. 14, 2015; 5 pages.

\* cited by examiner

METHOD AND APPARATUS PERTAINING TO ENERGY EFFICIENT TASK EXECUTION OFFLOADING

RELATED APPLICATION(S)

This application claims the benefit of U.S. Provisional application No. 61/415,606, filed Nov. 19, 2010, which is incorporated by reference in its entirety herein.

TECHNICAL FIELD

This disclosed concept relates generally to the execution of computational tasks and more particularly to shifting execution from one platform to another in an energy efficient manner.

BACKGROUND

When a computational platform processes software instructions, this often entails executing one or more specific tasks. Successfully executing a task, in turn, at the least requires that the computational platform have the native ability and necessary functionality to carry out the task and also that the computational platform have sufficient resources (such as sufficient available energy, memory, and so forth) to complete the task.

The prior art contains suggestions that execution of a given task can be transferred from one platform to another in order to supplant deficiencies in these regards. Though successful to some extent, these known approaches are not necessarily suitable or even successful in all application settings. We have determined that mobile application settings, for example, pose numerous challenges in these regards. These challenges include, by way of illustration, protecting the resources available not only to the transferring platform but also to the receiving platform.

Figure 1:
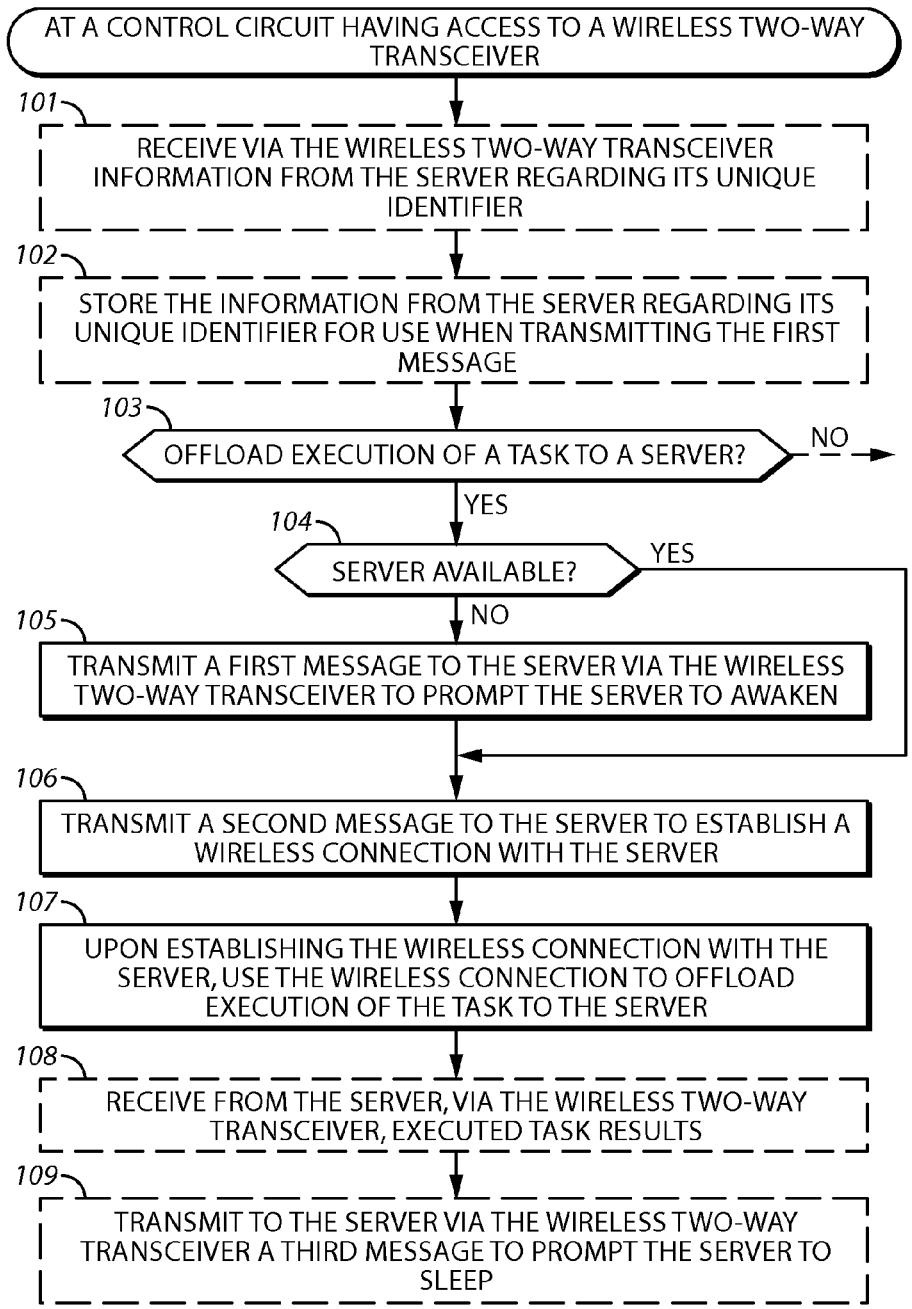
FIG. 1 comprises a flow diagram as configured in accordance with various embodiments of the disclosed concept.

Elements in the figures are illustrated for simplicity and clarity and have not necessarily been drawn to scale. For example, the dimensions, relative positioning, or both of some of the elements in the figures may be exaggerated relative to other elements to help to improve understanding of various embodiments of the present disclosed concept. Also, common but well-understood elements that are useful or necessary in a commercially feasible embodiment are often not depicted in order to facilitate a less obstructed view of these various embodiments of the present disclosed concept. Certain actions or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a control circuit having access to a wireless two-way transceiver determines a need to offload execution of a task to a server and then determines present availability or unavailability of that server. When the server is not presently available, this control circuit transmits a first message to the server via the wireless two-way transceiver to prompt the server to awaken. The control circuit then transmits a second message to the server to establish a wireless connection there between and then uses that wireless connection to offload execution of the task to the server.

By one approach the control circuit can comprise a part of a mobile platform such as a so-called smartphone. If desired, the wireless two-way transceiver comprises a short-range personal-area wireless two-way transceiver (such as, but not limited to, a Bluetooth-compliant transceiver).

By one approach, the aforementioned first message can include a unique identifier for the server. If desired, this unique identifier can have been provided earlier by the server via a general broadcast. These teachings will accommodate other approaches in these regards as well, however. For example, by one approach, an end user of the control circuit can be prompted to enter the unique identifier via a corresponding user interface.

These teachings will also accommodate having the control circuit utilize information regarding the server's available services to inform the determination regarding the need to offload execution of a task to that server. By one approach, this information, too, can be provided by the server via an earlier broadcast message.

When the server concludes executing the task, by one approach the server then returns the results of that activity to the control circuit. If desired, the control circuit can then responsively transmit to the server (again via the wireless two-way transceiver) a third message to prompt the server to return to a sleep state.

So configured, a variety of end-user platforms (such as one or more personal digital assistants (PDA's), smartphones, laptop computers, netbook computers, pad-styled computers, and so forth) can offload tasks to be executed amongst themselves to take advantage of available computational abilities, communication bandwidth and energy reserves. By supporting a native ability to awaken a candidate server from a sleep state (and to return that server to a sleep state upon concluding execution of the task) these advantages accrue without also imposing an unnecessary standby drain on local energy reserves for that server.

These teachings are flexible in practice and highly scalable to accommodate a wide variety and number of platforms and enabling technologies in these regards. These teachings can also be rendered in a highly automated manner or to include a desired degree of end-user interaction. In many application settings the described approaches can be implemented in a cost-effective manner and with little or no additional hardware requirements beyond what the basic platform may already present.

These and other benefits may become clearer upon making a thorough review and study of the following detailed description. Referring now to the drawings, and in particular to FIG.

1, an illustrative process 100 that is compatible with many of these teachings will now be presented. For the sake of illustration the following described process 100 presumes realization via a control circuit that has access to a wireless two-way transceiver.

At an optional step 101 the control circuit receives (via, in this illustrative example, the wireless two-way transceiver) information from one or more servers regarding their unique identifiers. Such a transmission can comprise a general broadcast that is not intended for any particular recipient. By another approach, however, this transmission can be specifically directed to a control circuit that has previously probed the server for this information.

These teachings will accommodate a range of possibilities in these regards. These identifiers can be "unique," for example, in a literal sense or can be relatively one-of-a-kind (as when the identifier is unique within a limited network sense). Such an identifier can be assigned to the server at a time of manufacture or at any time thereafter as desired. These teachings will also accommodate both static identifiers (which, once assigned to a given server, never change) as well as dynamic identifiers (which can be assigned or assumed for any amount of time as may be desired).

By one approach, this step can also comprise receiving from the server information regarding its available services. This can include information regarding, for example, particular signal-processing capabilities, locally-available data, authentication capabilities, and so forth. By one approach, this information can be presented using codes that represent such services (either categorically or with specificity as desired). If desired, this information can also provide notice with respect to remotely-sourced services that the server can access when needed.

If desired, this available-services information can be included in a same general-broadcast message that includes the aforementioned unique identifier. By another approach, either in lieu of the foregoing or in combination therewith, this available-service information can be provided in response to a specific request from the control circuit.

In any event, upon receiving such information from a server, at optional step 102 the control circuit can store this information. This, in turn, permits this information (such as the unique identifier for the server) to be utilized later as described below when transmitting messages to the server. By one approach, such information, once stored, can be retained until specifically deleted by an end user of the control circuit. These teachings will also accommodate, however, automatic deletion of such stored information per any schedule or protocol of choice. By way of illustration and without intending any limitations in these regards, this might comprise automatically deleting such information that has been stored without use for more than some predetermined period of time such as one hour, one day, one week, or the like.

At step 103, this process 100 provides for determining whether to offload execution of a task to a server. Such a decision 103 might be automatically prompted, for example, whenever the control circuit looks to execute a task of a particular category or that is expected to consume more than a particular amount of one or more resources of interest (such as time, instructions per second, battery power, and so forth).

The determination itself can be based upon one or more criterion of choice. By one approach, for example, the control circuit can base this determination, at least in part, upon the absolute or relative necessity of offloading the task to a server. The control circuit, for example, can decide to offload a particular task to a server when the control circuit itself lacks available native resources (such as battery power, computational and communication capacity or ability, and so forth) to complete execution of the task. As another example, the control circuit may decide to offload task execution to a server when the control circuit seeks to husband and conserve its own available resources (such as battery reserves) notwithstanding that the control circuit has, in fact, sufficient present resources to permit fully executing the task at hand.

As another example of a potentially useful criterion to employ in these regards, the control circuit can also consider the suitability of the server to execute the task at hand. Such a determination can be based, for example, upon previously-stored information regarding the server's available services. When the available server is not able to satisfactorily execute the task, or when executing the task may unduly reduce the server's own resources (such as battery power) more detrimentally than local execution of the task will reduce the control circuit's local resources, the control circuit can decide to not offload the task to the server.

It should be understood that this step 103 of determining whether to offload a task to a server can be flexibly applied in practice. This can comprise, for example, selecting from amongst a plurality of servers in these regards. As an illustrative example in these regards, when there are two available servers that are both able to execute the offloaded task, the control circuit can determine to use a particular one of the servers having the greater energy reserves (thereby preserving battery power for the excluded server). As another illustrative example in these regards, when there are multiple available servers that are all capable of executing the offloaded task, the control circuit might decide to parse the task into a plurality of sub-tasks which are then offloaded in a parsed manner amongst the available servers.

When the control circuit decides at this step 103 to not offload the task to a server, this process 100 effectively concludes. The control circuit can then presumably carry on in any desired fashion. This might comprise, for example, itself executing the task. This might also comprise, as appropriate, providing a notice to an end user that the task cannot be executed. This might also comprise, as appropriate, vetting one or more alternative tasks that are either locally executable or that can be appropriately and usefully offloaded to a server.

Upon deciding, however, at step 103 to offload execution of one or more tasks to a particular server, at step 104 the control circuit then determines whether the server is, in fact, presently available. This can comprise, for example, determining whether the server of choice is in a sleep mode of operation. As used herein the expression "sleep" will be understood to refer to a stand-by mode of operation during which the circuit reduces or eliminates the provision of electrical power to many of its ordinarily-powered components. Those skilled in the art will understand that a sleep state is an intentional and planned state that serves the usual purpose of conserving energy resources. A sleep state is different from an "off" state in that some portion or portions of the sleeping platform (such as a random access memory (RAM) component) continue to receive power. There are numerous levels of sleep known in the art and various methodologies by which the sleep state is induced and withdrawn. As the present teachings are not overly sensitive to any particular choices in these regards, further description in these regards will not be provided here.

When the server is unavailable for such a reason, this process 100 provides, at step 105, for transmitting a first message to the server (via the aforementioned wireless two-way transceiver) to prompt the server to awaken. This can comprise, for example, a specific message that addresses the server (using the aforementioned unique identifier) and that optionally includes a command, signal, operational code, or the like that will cause the server, upon reception, to awaken from the sleep state and hence become available to receive and execute an offloaded task.

Those skilled in the art will appreciate that the foregoing can be implemented in a variety of ways. By one approach a common interface, used by both platforms, can serve well in these regards. Such an interface can be styled, for example, as a universal computation and communication interface (UCCI) and can be specifically configured to enable communications between such platforms as a mobile two-way communications client and a nearby server device (such as another mobile two-way communications platform, a laptop computer, or the like).

Figure 2:
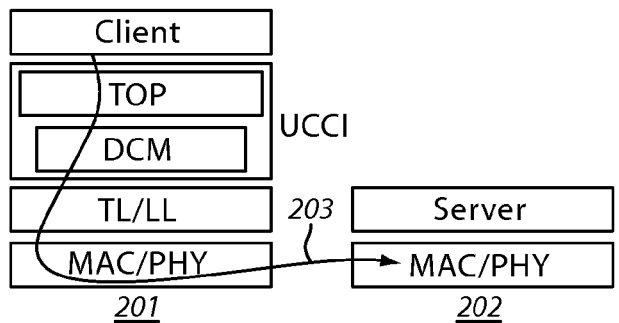
FIG. 2 comprises a schematic representation as configured in accordance with various embodiments of the disclosed concept.

FIG. 2 depicts a non-limiting illustrative example of a client-side network protocol stack 201 in these regards, where "TOP" refers to Task Offloading Protocol, "DCM" refers to a device and connection management layer to control the establishment of communications with the server as per these teachings, "TL/LL" refers to Transport Layer/Link Layer, and "MAC/PHY" refers to Media Access Control/open systems interconnection (OSI)-model Physical Layer. FIG. 2 also depicts a non-limiting illustrative example of a relevant portion of a counterpart server-side network protocol stack 202. So configured, the control circuit can selectively form and transmit to the server a signal 203 that will cause the server to awaken from a sleep mode.

Referring again to FIG. 1, at step 106 the control circuit then transmits a second message to the server to establish a wireless connection with the server. By one approach, the control circuit can wait at least a predetermined period of time (such as five seconds, ten seconds, twenty seconds, or the like) after transmitting the first message to awaken the server before transmitting this second message. This delay can serve, for example, to provide the server with sufficient time to become fully operational and hence to be ready to fully communicate with the control circuit and accept an offloaded task.

This second message can make use of any signaling protocol of choice that will suffice in these regards. The primary purpose of this second message is to establish a wireless connection that these two end points can then utilize to carry out a more substantive exchange. As will be disclosed below in more detail, this signaling protocol can comprise a Bluetooth-compatible protocol if desired.

At this point in the description it may be useful to also note that when the control circuit determines, at step 104, that the server is not asleep and hence is presently available to receive the offloaded task, the control circuit can skip step 105 and proceed directly to step 106 to establish the wireless connection as described.

Figure 3:
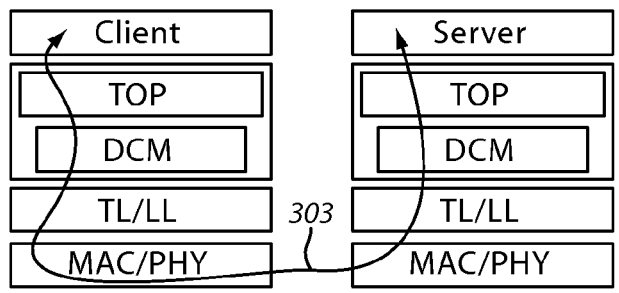
FIG. 3 comprises a schematic representation as configured in accordance with various embodiments of the disclosed concept.

At step 107, upon establishing this wireless connection with the server the control circuit uses this wireless connection to offload execution of the task (or subtask or tasks) to that server. FIG. 3 schematically illustrates such a communication 303 between the client stack 301 and the server stack 302.

The precise nature of this offloading process can of course vary with the application setting. In some cases (as when the control circuit can provide one or more links that will lead the server to relevant raw data) the control circuit may provide only a minimal amount of information, trusting the server to itself acquire the source information needed to execute the task. In other cases the control circuit may pass some or all of the source content that the server may need in order to execute the task.

These teachings will accommodate other approaches as well in these regards. As but one illustrative example in these regards, when the task comprises a process that may not be particularly bulky in and of itself, but which must be iterated a great number of times in order to achieve a desirable result, the control circuit may transfer the executable instructions that comprise the process in order to facilitate offloading such a task.

Eventually, the server will likely complete the offloaded task. In some cases this may be enough in and of itself (as when the server itself is also the ultimate destination for the task results). In other cases it may be useful to convey the executed-task results elsewhere. These teachings will accommodate, for example, having the server direct the executed-task results to a remote database or service of choice. These teachings will also accommodate, as desired, optional step 108 to permit the control circuit itself to receive the executed-task results from the server (again via the wireless two-way transceiver; note that this may make use of the previously-established wireless connection or may require establishing a new wireless connection as appropriate).

As mentioned above, these teachings will permit the control circuit to transmit a message to specifically cause the server to awaken from a sleep state in order to receive the offloaded task and to execute that task. In such a case, and as desired, these teachings will also accommodate the optional step 109 of having the control circuit transmit to the server (again via the wireless two-way transceiver) a third message to prompt the server to return to a sleep state.

The transmission of such a "sleep" message can be prompted, for example, by the control circuit receiving executed-task results from the server. Such a transmission could also be prompted based upon receiving, for example, an acknowledgement message from a remote database that the latter has received the executed-task results from the server.

So configured, a control circuit of choice can readily interact with physically-local servers to efficiently and expediently arrange for the execution of a variety of tasks in a manner that can be mindful and respectful of the processing capabilities and implementation resources of both the control circuit and the servers. This can be highly transparent to the control circuit's end user if desired. These teachings will also accommodate, however, permitting or requiring the end user to play one or more parts in the process.

For example, by one approach, the control circuit can display to the end user the servers that are available to execute a given task to be offloaded in order to permit, or require, the end user to make a particular choice in these regards. When offering such a display, if desired, the control circuit can further indicate one or more parameters of interest for one or more of the available servers (such as, but not limited to, available battery life, estimated execution time, security ratings, likely or estimated quality-of-service ratings for the wireless links to be used for each such server, and so forth). These teachings will also accommodate making a corresponding display at the server to alert the server's end user of the incoming task-offloading request to thereby permit, for example, that end user to decline the request.

Figure 4:
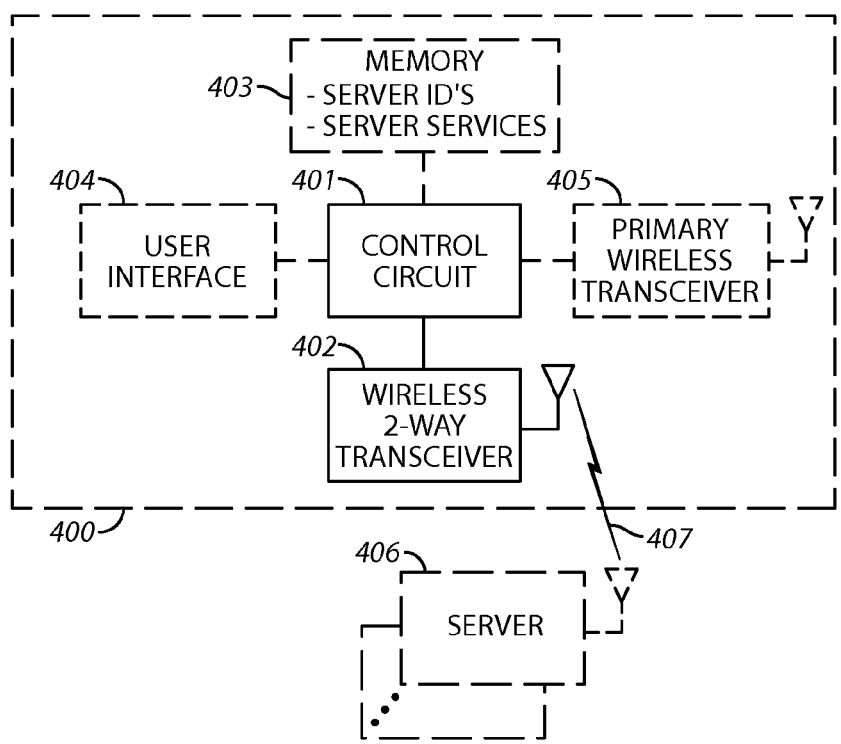
FIG. 4 comprises a block diagram as configured in accordance with various embodiments of the disclosed concept.

The above-described processes are readily enabled using any of a wide variety of available, readily-configured platforms, including partially or wholly programmable platforms as are known in the art or dedicated purpose platforms as may be desired for some applications. Referring now to FIG. 4, an illustrative approach to such a platform will now be provided.

This platform 400 can comprise any of a variety of known or hereafter-developed devices. In many cases this platform 400 will comprise a portable device that is designed, configured, and intended to be carried by or on the person of a typical, average adult human being during ordinary course of usage. Examples in these regards include, but are certainly not limited to, handheld cellular telephony devices (including so-called smartphones), laptop computers, so-called netbooks, dedicated electronic reading devices, electronic pads, personal digital assistants, and so forth.

In this illustrative example this platform 400 generally comprises a control circuit 401 that operably couples to a wireless two-way transceiver 402. Such a control circuit 401 can comprise a fixed-purpose hard-wired platform or can comprise a partially or wholly programmable platform. All of these architectural options are well known and understood in the art and require no further description here. This control circuit 401 can be configured (via, for example, corresponding programming when the control circuit 401 comprises an at-least-partially programmable platform) to carry out one or more of the steps, actions, or functions described herein.

As alluded to above, the wireless two-way transceiver 402 can comprise a short-range personal-area wireless two-way transceiver. As used herein, the expression "short-range" will be understood to refer to ten meters or less of expected range (with somewhat greater ranges being possible given particularly favorable operating conditions and lesser distances being common in less-favorable operating conditions). Bluetooth-based transceivers comprise one useful example in these regards (including various versions of Bluetooth-based protocols and operational requirements and constraints).

By one approach, this platform 400 can further comprise a memory 403 that operably couples to the control circuit 401. (Those skilled in the art will understand that this memory 403 can comprise an integral part of another component, such as the control circuit 401, or may itself comprise a plurality of discrete, physical components that together serve in these regards.) Such a memory 403 can serve, for example, to store the aforementioned unique server identifiers, information regarding available server services, and so forth. This memory 403 can also serve, if desired, to store programming for the control circuit 401 as appropriate.

By one approach this platform 400 can also comprise a user interface 404 that operably couples to the control circuit 401. This user interface 404 can comprise, for example, a used-input mechanism (such as a touchscreen display, any of a variety of buttons, switches, or the like, a keyboard or keypad, any of a variety of cursor-control mechanisms (including, but not limited to, a mouse, a joystick, a trackball, a touchpad, and so forth), a voice recognition interface, and so forth). This user interface 404 can also comprise, as desired and in lieu of the foregoing or in combination therewith, a user-output mechanism (such as an active display, signal lights, an audio annunciator, a haptically-based transducer, a printer, and so forth). Such a user interface 404 can serve, for example, to communicate information regarding available servers to an end user and to receive end-user instructions regarding the selection of a particular server to receive an offloaded task.

Such a platform 400 can further optionally comprise, if desired, a primary wireless transceiver 405 that also operably couples to the control circuit 401. This primary wireless transceiver 405 can comprise, for example, a cellular-telephony transceiver. By another approach this primary wireless transceiver 405 can comprise a so-called wifi transceiver that operates using any of a variety of 802.11-family of signaling and operating protocols. As yet another example in these regards this primary wireless transceiver 405 can comprise a so-called wi-max transceiver that operates using an 802.16-family of signaling and operating protocols. As used in this regard, the expression "primary" will be understood to denote that this particular wireless transceiver comprises, for the ordinary expected end user, a primary wireless capability (as when, for example, the platform 400 comprises a cellular telephone).

So configured, this platform 400 can readily communicate with one or more nearby servers 406 (having a similar local communications capability) via a wireless carrier(s) 407. In particular, this platform 400 can carry out such a communication using its wireless two-way transceiver 402. So configured, this platform 400 can readily act in conformance with the various processes described herein.

Figure 5:
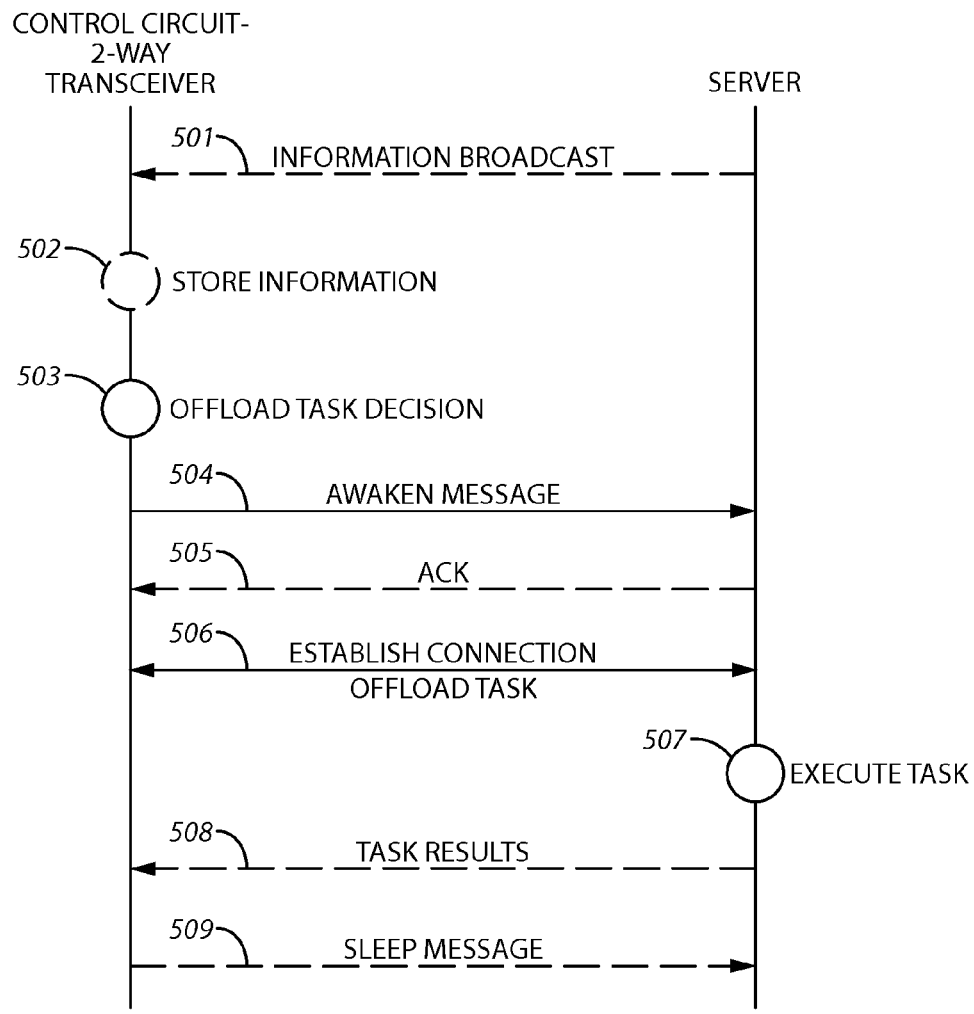
FIG. 5 comprises a call-flow diagram as configured in accordance with various embodiments of the disclosed concept.

As an illustrative example in these regards, and without intending any particular limitations, FIG. 5 presents a call-flow diagram as between such a platform and such a server.

As one optional possibility in these regards, this server may broadcast from time to time an information broadcast 501 that includes, for example, its unique identifier along with information regarding its supported services (i.e., tasks that the server can execute upon request). Such a broadcast can occur as regularly or irregularly as may be desired. When such a broadcast occurs, and particularly when the broadcast includes information that is new to the control circuit, the latter can store 502 some or all of this information for future use.

In any event, at some later time the control circuit can decide 503 to offload a particular task. In this example the control circuit then transmits an awaken message 504 to the server to prompt the latter to awaken from a sleep state. By one optional approach, if desired, the server can respond (when fully awake, for example) by transmitting an acknowledgement message 505 to the control circuit. As one alternative, the control circuit can simply wait a certain amount of time to permit the server to fully awaken before proceeding further.

The control circuit then works in tandem with the server to establish a wireless connection and offload the task 506 to the server. The server then executes 507 this task. By one optional approach, the server then transmits these task results 508 to the control circuit. In any event, and pursuant to another optional approach, the control circuit then transmits a sleep message 509 to the server to prompt the latter to enter a corresponding sleep state to thereby conserve its power resources.

These teachings permit even modestly powered or modestly capable platforms to leverage the capabilities and resources of nearby platforms to thereby provide the benefits of significant processing results to an end user without unduly compromising the resources of those nearby supporting platforms. By incorporating a compatible capability in these regards into a wide variety of portable platforms a highly flexible and dynamic allocation of power as well as communication and computational ability can be readily, economically, and efficiently achieved. Furthermore, these teachings will accommodate as little, or as much, end-user involvement as may be desired in a given application setting. These teachings are also highly scalable and are readily applied in conjunction with a wide variety and number of corresponding platforms.

Those skilled in the art will recognize that a wide variety of modifications, alterations, and combinations can be made with respect to the above described embodiments without departing from the spirit and scope of the disclosed concept, and that such modifications, alterations, and combinations are to be viewed as being within the ambit of the inventive concept. As one simple example in these regards, the described process can include an accounting step to permit a given server to effectively charge the control circuit's end user some fee for accepting and executing a particular offloaded task.

We claim:

1. A method comprising:
at a control circuit having access to a wireless two-way transceiver:
determining a need to offload execution of a task to a server by, at least in part, using information from the server regarding the server's available services to determine suitability of the server to execute the task;
determining present unavailability of the server;
transmitting a first message to the server via the wireless two-way transceiver to prompt the server to awaken;
transmitting a second message to the server to establish a wireless connection with the server;
upon establishing the wireless connection with the server, using the wireless connection to offload execution of the task to the server.

2. The method of claim 1 wherein the wireless two-way transceiver comprises a short-range personal-area wireless two-way transceiver.

3. The method of claim 1 wherein the first message includes a unique identifier for the server.

4. The method of claim 3 further comprising, prior to determining the need to offload execution of the task to the server:
receiving via the wireless two-way transceiver information from the server regarding the server's unique identifier;
storing the information from the server regarding the server's unique identifier for use when transmitting the first message.

5. The method of claim 4 wherein receiving via the wireless two-way transceiver information from the server regarding the server's unique identifier further comprises receiving via the wireless two-way transceiver the information from the server regarding the server's available services.

6. The method of claim 1 further comprising:
receiving from the server, via the wireless two-way transceiver, executed task results.

7. The method of claim 6 further comprising:
in response to receiving the executed task results, transmitting to the server via the wireless two-way transceiver a third message to prompt the server to sleep.

8. The method of claim 1 further comprising:
upon determining present availability of the server:
transmitting the second message to the server to establish a wireless connection with the server;
upon establishing the wireless connection with the server, using the wireless connection to offload execution of the task to the server.

9. An apparatus comprising:
a wireless two-way transceiver:
a control circuit operably coupled to the wireless two-way transceiver and being configured to:
determine a need to offload execution of a task to a server by, at least in part, using information from the server regarding the server's available services to determine suitability of the server to execute the task;
determine present unavailability of the server;
transmit a first message to the server via the wireless two-way transceiver to prompt the server to awaken;
transmit a second message to the server to establish a wireless connection with the server;
upon establishing the wireless connection with the server, use the wireless connection to offload execution of the task to the server.

10. The apparatus of claim 9 wherein the wireless two-way transceiver comprises a short-range personal-area wireless two-way transceiver.

11. The apparatus of claim 9 wherein the first message includes a unique identifier for the server.

12. The apparatus of claim 11 wherein the control circuit is further configured to, prior to determining the need to offload execution of the task to the server:
receive via the wireless two-way transceiver information from the server regarding the server's unique identifier;
store the information from the server regarding the server's unique identifier for use when transmitting the first message.

13. The apparatus of claim 12 wherein the control circuit is further configured to receive via the wireless two-way transceiver the information from the server regarding the server's available services.

14. The apparatus of claim 9 wherein the control circuit is further configured to:
receive from the server, via the wireless two-way transceiver, executed task results.

15. The apparatus of claim 14 wherein the control circuit is further configured to:
in response to receiving the executed task results, transmit to the server via the wireless two-way transceiver a third message to prompt the server to sleep.

16. The apparatus of claim 9 wherein the control circuit is further configured to:
upon determining present availability of the server:
transmit the second message to the server to establish a wireless connection with the server;
upon establishing the wireless connection with the server, use the wireless connection to offload execution of the task to the server.

* * * * *